United States Patent Office 2,736,434
Patented Feb. 28, 1956

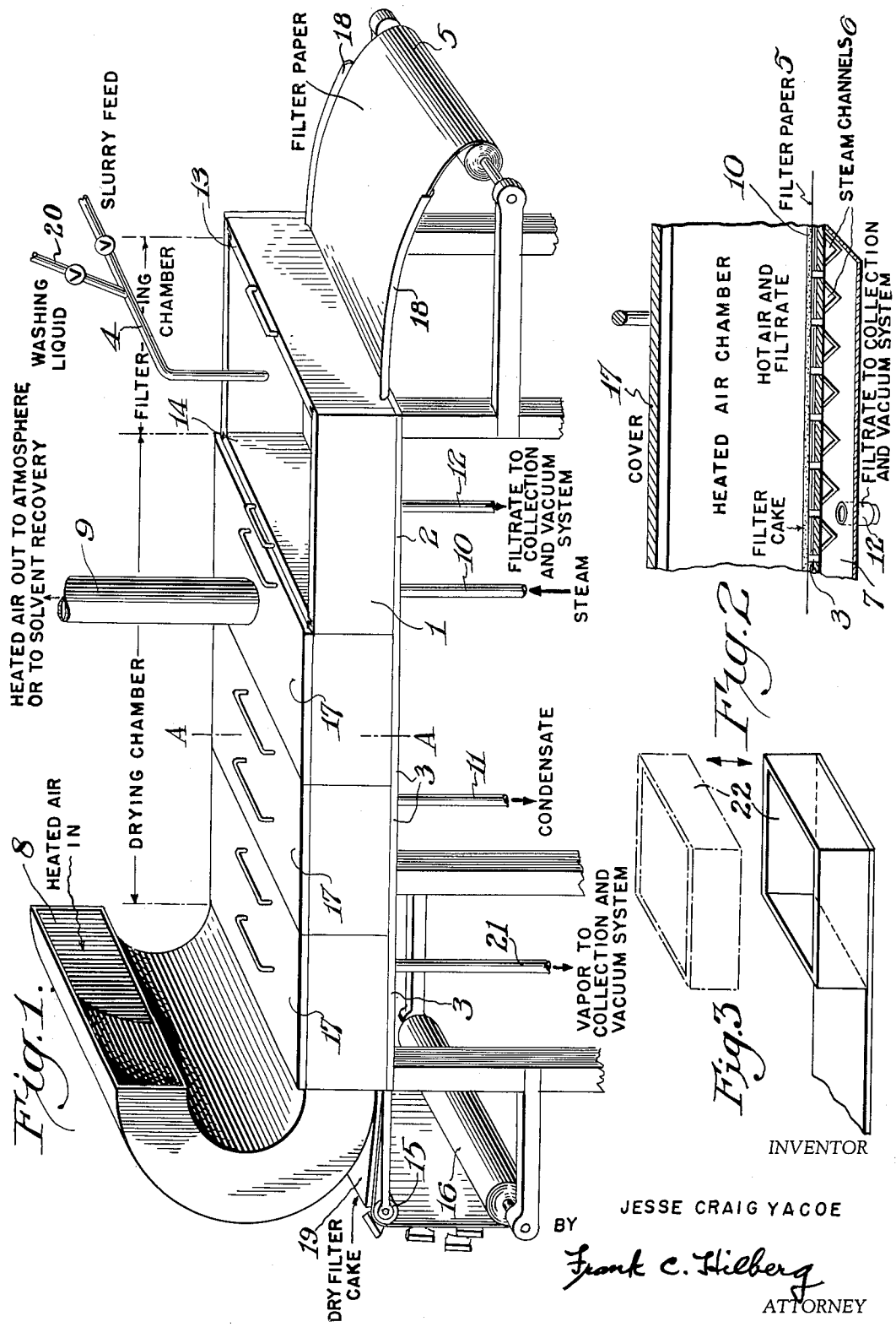

2,736,434

SEMICONTINUOUS COMBINED FILTER AND DRIER

Jesse Craig Yacoe, New Castle, Del., assignor to E. I. du Pont de Nemours and Company, Wilmington, Del., a corporation of Delaware Application August 9, 1952, Serial No. 303,622

5 Claims. (Cl. 210—150.6)

This invention relates to a filter, and more particularly to a unique combination of filter and drier adapted to operate in a semi-continuous manner when treating relatively large volumes of a given slurry or to be used batchwise with smaller amounts of different slurries.

A very common operation in the preparation of chemicals and similar materials resides in the removal of solids from slurries or suspensions. Heretofore one of the most common methods of separating such solids is to remove most of the liquid in a filter press or on a nutsch, and then transfer the wet filter cake to a drying oven on which it is dried in trays. Such a method necessarily must be operated on a batch basis and requires considerable labor, apparatus and space. It also has the disadvantage that much of the process is carried out in the open, which is conducive to contamination.

Many devices have been proposed to simplify the separation and drying of solids contained in large amounts of liquid, such as precipitates and slurries, etc. Practically without exception, apparatus which accomplishes filtering, washing and drying is extremely complicated and expensive, and due to the corrosive nature of the slurries usually encountered, deterioration of the apparatus represents a formidable problem.

In many filtering devices, suction is applied to the filtering means and considerable support of the filter place is required which, in turn, involves such a high degree of friction that movement of the filter medium is practically prohibitive. It has also been proposed to move the support with the filter, but such apparatus is intricate and offers other difficulties.

In some installations where a single product is made in large quantity, an elaborate filtering apparatus may be justified, but when relatively small volumes of a large number of materials are to be treated, it is impractical to wash the complicated apparatus between each batch to be filtered.

It is therefore an object of the present invention to provide a means for filtering and drying solid material contained in slurries, which is adapted to a wide variety of products and which may be used in a semi-continuous or batch-wise fashion. Another object is the provision of an efficient means for filtering slurries of different kinds successively with a minimum of cleaning between batches. Other objects will appear as the description of the invention proceeds.

These and related objects are accomplished by a combined filter and drier which consists essentially of a perforated plate adapted to be heated, a filter cloth or paper fitted over the plate and a vacuum applied to the opposite side of the plate. A commercial embodiment has a trough which is divided into at least two compartments, the first of which is used for filtering the main body of liquid from the slurry, and washing the retained solid material on the filter. The other sections of the device are used as a drying chamber as will be described more fully hereinafter. The slurry is retained in the first section by removable dams which are raised when a given batch of filter cake has been washed and just prior to being advanced to the drying chamber.

In the drawing Figure 1 is a plan elevation of the device. Figure 2 is a section along the lines A—A in Figure 1. In both figures the numerals refer to the same parts. Figure 3 shows a modification of the filtering chamber.

In the drawing, 1 represents the sides of the trough which is provided with a bottom consisting essentially of a plurality of longitudinally grooved perforated plates shown as 2 and 3. Below these plates is provided a vacuum chamber 7 for sucking the liquid through the filter. This liquid is drawn off through pipe 12 to a filtrate collection and vacuum system (not shown). The drying chamber is provided with heating means which consist essentially of steam channels 6 shown in Figure 2 as V-shaped. The steam is introduced into these channels by a header (not shown) on one or both sides of the channels. Steam channels are provided with an inlet 10 and an outlet 11.

The filtering compartment is provided with dams or gates 13 and 14, which may be raised by hand or automatically as desired. The slurry and washing liquid are introduced into the filter chamber through slurry feed inlet means 4. The device is also provided with a filter paper or similar filtering means 5 which is supported by an apron 18, preferably having bent up edges to give the paper a shallow U-shape in cross-section.

The drying chamber is provided with an inlet 8 through which heated air may be introduced, and an outlet 9 from which it is withdrawn from the drying chamber. As the filter cake 19 passes through the machine, it is advanced over a support and roller 15 and then drops down into a storage bin. The filter paper 5 is wound up on roll 16. The device is also provided with covers 17 over the drying chamber and filtering chamber also if desired, although the cover on the latter is not shown. Vapors are withdrawn through pipe 21 to the collection and vacuum system.

In the operation of the device, the slurry to be filtered is introduced through slurry feed 4 into the filtering chamber, and vacuum is applied through pipe 12. The liquid passes through the filter paper 5 and plate 2 downwardly into vacuum chamber 7 and out through pipe 12. When the filter cake has been built up to the desired thickness, the slurry feed is shut off and water or other liquid used as a washing medium is introduced through pipes 4 and 20. When the filter cake has been sufficiently washed and sucked dry, the dams 13 and 14 are raised and filter paper is wound up on roll 16, which causes the filter cake to advance into the drying chamber. The dams 13 and 14 are then lowered into their original position and more slurry is fed into the filtering compartment.

While this batch of slurry is being filtered, the first batch is being dried in the drying chamber. The cycles usually are regulated by the amount of heat and air supplied to the drying chamber so that the filter cake will be dry at about the same time as the second batch of filter cake has been built up to the proper thickness in the filtering compartment. At this time the dams are again raised and the filter paper bearing the dried and wet filter cakes are advanced. The dry filter cake passes from the drying chamber over roll 15 and drops down into the storage bin. Successive batches are treated in like manner.

The filter paper 5 may be used over and over, and when roll 16 is full, it is removed and washed if necessary and returned to position 5, which represents the unwind roll of the filter paper. Preferably, since the paper is inexpensive, it may be discarded after one pass. The paper used in the invention is a latex-treated paper which has a high wet strength. If paper having a low wet strength is used, it must be supported by a fabric or similar web which bears the strain of advancing the filter cake. While the invention is illustrated with paper as the filtering medium, cloth of various weaves, canvas, muslin, felt and similar sheet material may, in some cases, be preferred.

The apparatus of the present invention is particularly adapted to batches of different materials. For example, in actual operation with an aqueous slurry containing 10% of an alpha or beta-aminoanthraquinone with drying plates at 150–175° C. and drying air at 120° C., a filter cake of about ¼" thick is built up and the filtration rates are from 50–100 pounds of slurry per hour per square foot of filtering surface. The drying rates in the same case are about 5 to 15 pounds of dried material per hour per square foot of drying surface with filtering times of 10–30 seconds and drying times of 4–6 minutes.

It will be obvious that many modifications to the apparatus may be made. For example, in place of the three drying chambers shown, 1, 2 or several may be used to correlate the drying and filtering times. It is usually most convenient to have the filtering and drying plates of about the same effective size so that the cake formed on the filter plate will fit the successive drying plates. The perforations in the plates are not critical, but may vary in size and arrangement, although it will be obvious that the size is dependent to a large extent on the strength of the filtering medium.

The arrangement shown in Figure 1 is convenient when a large number of steam channels must be provided for heating. In the filter plate and, in some cases, in the drying plate, when a very volatile solvent is to be removed, the heating may be omitted entirely. While steam is shown as the heating means and is preferred when volatile, inflammable solvents are used, it will be obvious that heated air or electricity may also be used in place of the steam. In place of the solid plate with perforations, a woven screen or an assembly of closely spaced parallel wires or ribbons may be used.

Another modification of the filtering chamber is the use of a rectangular frame 22 without top or bottom shown in Figure 3, and of the size of the filter plate or slightly smaller. In operation this frame is placed on the filter paper, and the slurry is introduced into the frame and suction applied. When a satisfactory thickness of filter cake is built up, the frame may be removed and the cake advanced to the drying chamber. If desired, the bottom edges of the frame, as well as the dams, may be provided with rubber to provide a tighter fit between the filtering medium of the frame or dam.

The present invention offers an advantage over the prior art in that a given filter cake will dry in a few minutes whereas in comparable prior art filters, a similar filter cake requires several times as long to dry to the same degree. This unexpected result is due primarily to the position of the heated perforated plate on the vacuum side of the filter. In its simplest form the filter may be similar to a Büchner funnel in which the conventional perforated base is replaced by one having heating means embedded in it or otherwise placed so that a considerable amount of heat is present at the immediate area at which the filtrate passes through the filter paper or cloth. The drawings show a commercial embodiment of the invention in which the perforated plate is heated with steam for economic reasons. For laboratory use a copper or brass perforated plate having a heating unit such as a Calrod unit embedded in it has proven exceptionally efficient.

While no theory is advanced to explain the unusual drying rates, there is evidence which indicates that the water or volatile solvent as it emerges from the vacuum side of the filter paper is assisted in its vaporization by the application of heat to replace the heat of vaporization normally given up at the vacuum-filter paper interface.

It will be apparent that many widely different embodiments of the invention may be made without departing from the spirit and scope thereof, and therefore it is not intended to be limited except as indicated in the appended claims.

I claim:

1. A combined filter and drying apparatus comprising a plurality of enclosed intercommunicating sections, each of said sections being provided with a bottom comprising a perforated plate, a filtering medium disposed longitudinally over the said plates, means for advancing and stopping the said filtering medium intermittently, an inlet for the first of the said sections for introducing the slurry to be filtered and liquid for washing the filtered slurry, temporary dams for confining the slurry to the said first section, suction means for drawing off the filtrate from the said section, an inlet and outlet for passing heated air over the subsequent sections, and additional means in the said subsequent sections, said means being in contact with the under side of the said perforated plate.

2. A combined filtering and drying apparatus comprising an intercommunicating filtering section and drying section, both sections being provided with a perforated bottom and means for advancing a continuous filtering medium over and in contact with the said bottom, the said filtering section being provided with an inlet for supplying the slurry to be filtered and an outlet for withdrawing the filtrate, means for temporarily confining the said slurry to the said filtering section, means for advancing the filter cake from the filtering section to the drying section, means for passing heated air into and out of the said drying section, and heating means in contact with the perforated bottom of the drying section.

3. The apparatus of claim 2 in which a wind-up roll is provided for advancing the filtering medium and the filter cake from the said filtering section into the said drying section.

4. The apparatus of claim 2 in which the filtering section is provided with a suction means for withdrawing the filtrate.

5. The apparatus of claim 2 in which the heating means of the drying section comprises steam channels beneath the said perforated bottom.

References Cited in the file of this patent

UNITED STATES PATENTS

| | | |
|---|---|---|
| 502,014 | Prangey | July 25, 1894 |
| 703,846 | Stewart | July 1, 1902 |
| 1,315,924 | Fuller | Sept. 9, 1919 |
| 1,881,404 | Haldey | Oct. 4, 1932 |
| 1,953,289 | Cohen | Apr. 3, 1934 |
| 2,021,122 | Fowler | Nov. 12, 1935 |
| 2,101,042 | Casey | Dec. 7, 1937 |
| 2,101,109 | Thomson | Dec. 7, 1937 |
| 2,441,169 | Roman | May 11, 1948 |
| 2,565,576 | Runton | Aug. 28, 1951 |